United States Patent [19]

Veazey

[11] 4,102,121
[45] Jul. 25, 1978

[54] THREE DIMENSIONAL TIME PIECE

[76] Inventor: Robert W. Veazey, Lustercraft Plastics, Inc. 1818 S. Meridian, Wichita, Kans. 67213

[21] Appl. No.: 739,435

[22] Filed: Nov. 8, 1976

[51] Int. Cl.² .................... F21V 3/00; G04B 19/22; G09B 27/00
[52] U.S. Cl. ......................... 58/44; 35/46 R; 35/47; 362/809
[58] Field of Search ............ 58/42.5, 44, 50 R; 35/46 R, 47; 362/809

[56] References Cited

U.S. PATENT DOCUMENTS

| | | | |
|---|---|---|---|
| 1,515,135 | 11/1924 | Alexander | 58/44 UX |
| 2,099,518 | 11/1937 | Hazlett | 58/44 |
| 2,333,475 | 11/1943 | Dupler | 58/44 |
| 2,907,166 | 10/1959 | Baccara | 58/44 |
| 3,197,893 | 8/1965 | Mariotti | 58/44 X |

*Primary Examiner*—Stanley J. Witkowski
*Attorney, Agent, or Firm*—John H. Widdowson; Edwin H. Crabtree

[57] ABSTRACT

A three dimensional time piece for determining the correct time anywhere in the world. The time piece having a world globe with a 24 hour time band therearound, and lighting inside the globe to indicate both night time and day time on the surface of the globe. The time piece further indicates the month of the year with changes in light intensity on the surface of the globe to represent the inclination of the sun and the corresponding season of the year.

4 Claims, 10 Drawing Figures

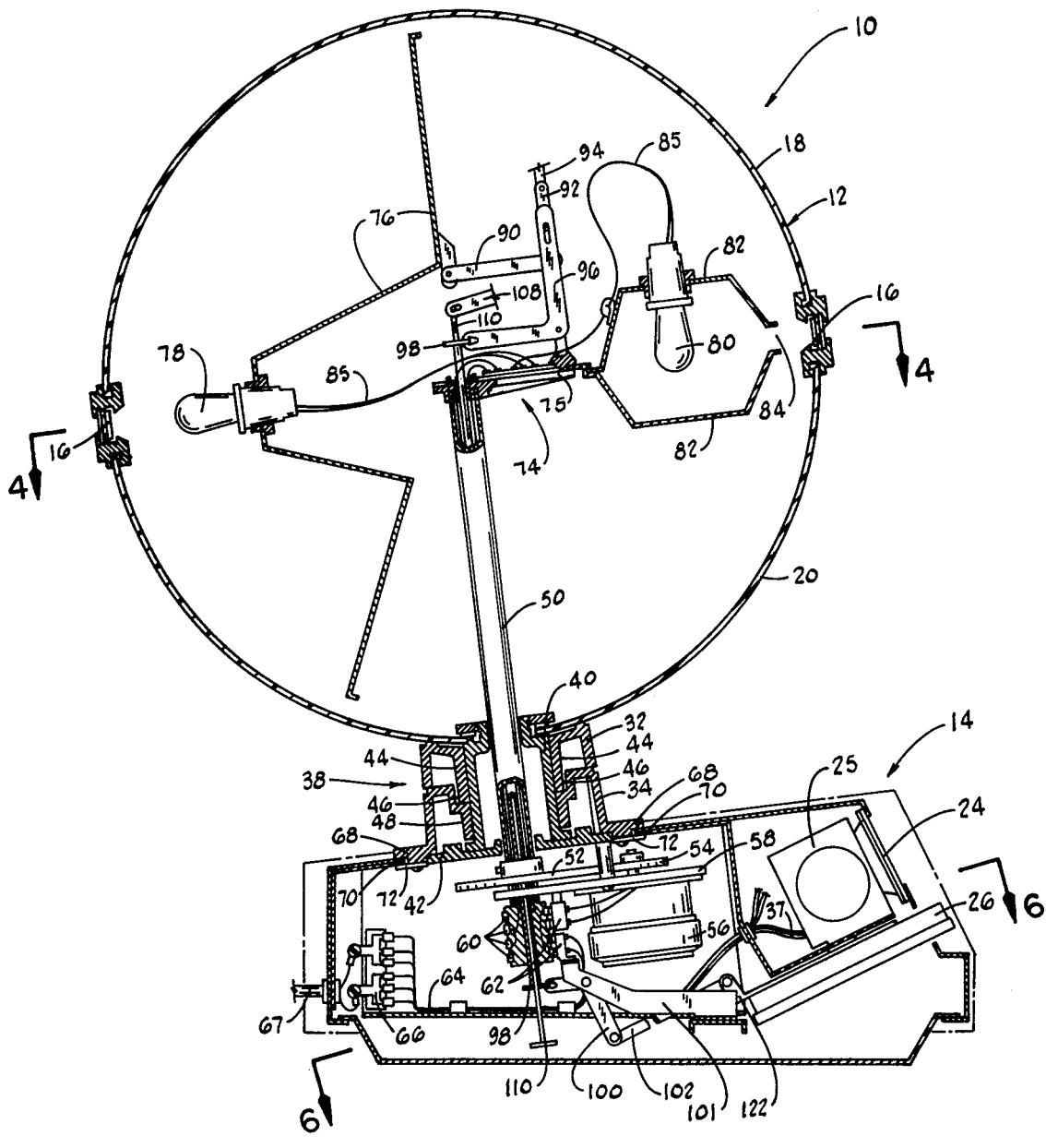

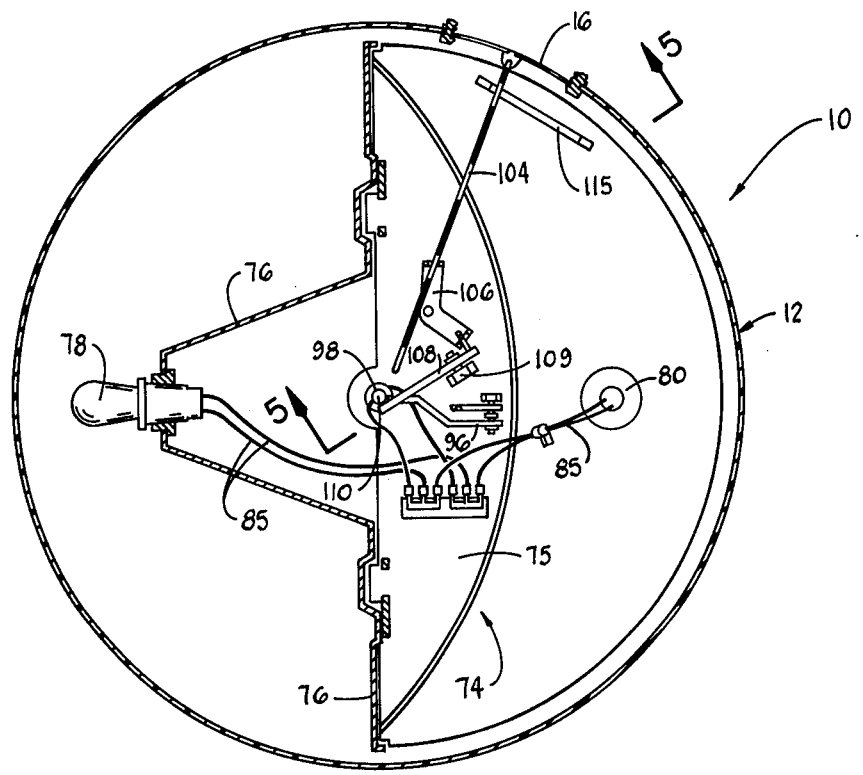
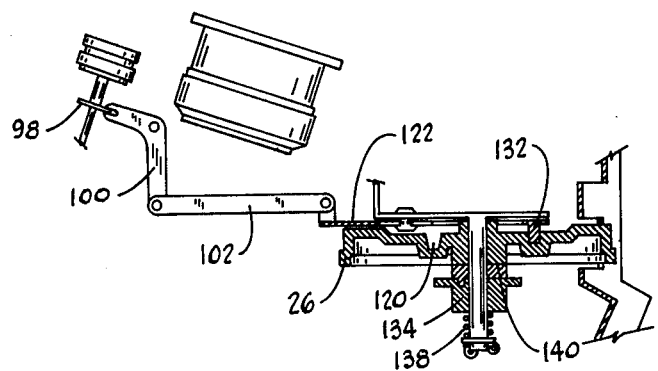

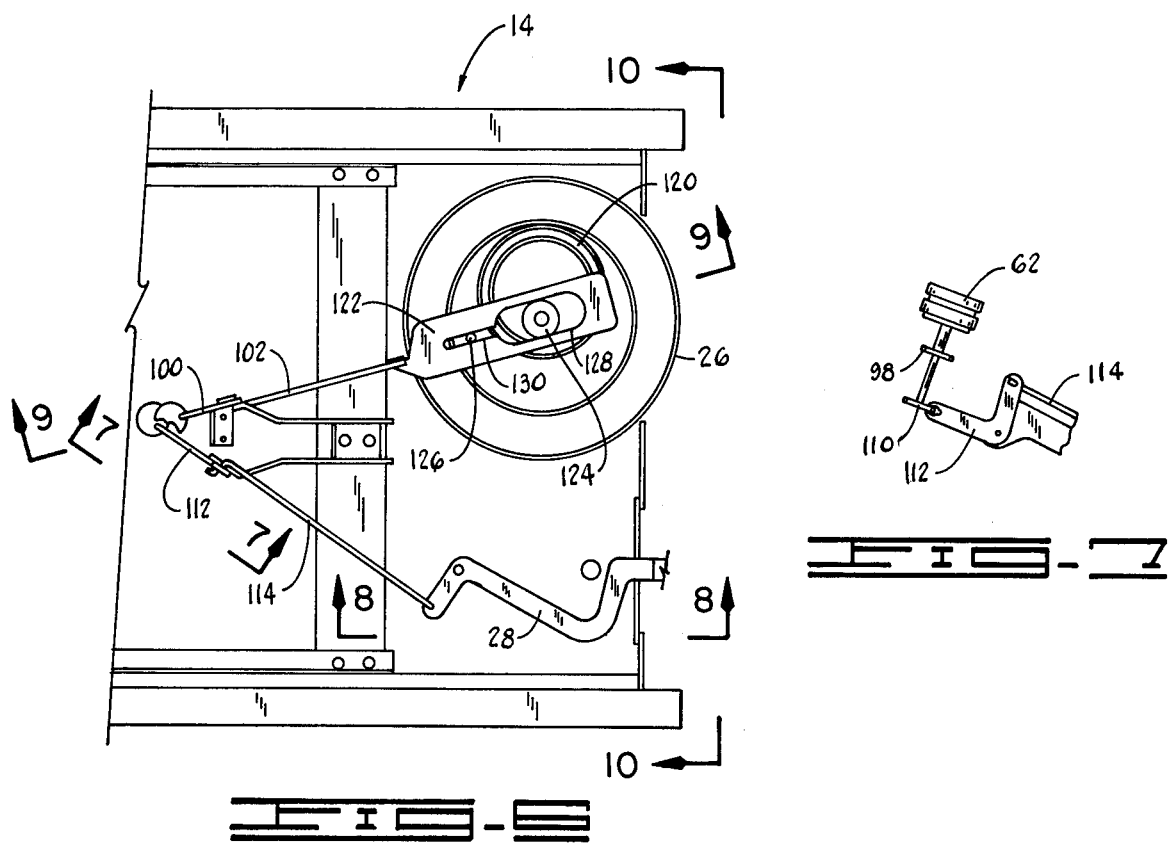
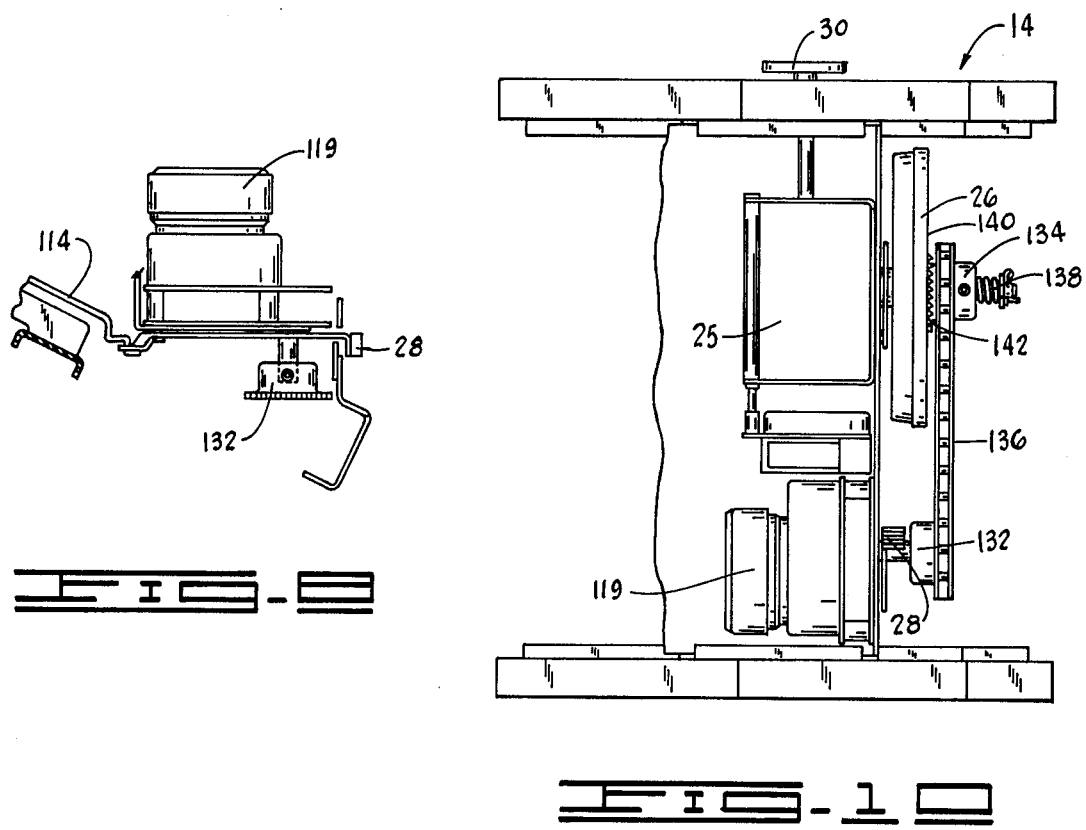

THREE DIMENSIONAL TIME PIECE

BACKGROUND OF THE INVENTION

This invention relates generally to time pieces, and more particularly, but not by way of limitation, to a three dimensional time piece for determining the correct time anywhere in the world.

Heretofore, there have been a variety of different types of three dimensional time pieces, clocks, and world globes with individual clocks mounted on the globes to indicate the time at various locations in the world. None of the prior art time pieces have incorporated a world globe having a 24 hour time band mounted thereon and having the novel features as described herein.

SUMMARY OF THE INVENTION

The viewer of the subject time piece can visually determine at a glance the correct time any place in the world, and also if the location at that moment is in day light or darkness.

The time piece illustrates the 24 time zones in the world and the international date line.

The invention provides the viewer with the present month of the year. Also, the lighting of the time piece is tilted inside a globe to represent the inclination of the sun and the corresponding season in the northern and southern hemisphere.

Also, the invention provides a lever for correcting the time piece when day light savings time is observed.

The three dimensional time piece includes a base having a clock mounted therein, a month dial, and a lever for changing the time piece when day light savings time is observed. A world globe is mounted on the base and includes 24 longitudinal lines equally spaced 15° apart on the surface thereof. The lines represent the time zones of the world. An hour time band is attached to the globe and mounted around the equator of the globe. The time band indicates the 24 hours of the day. A light and light shade are mounted inside the globe. The light shade longitudinally divides the inside of the globe. The light provides light for one side of the globe representing day time on the globe, while the shaded or unlighted side of the globe represents night time on the globe. The time band is driven by a synchronous motor which makes one revolution per 24 hours. The month dial is driven by a synchronous motor and makes one revolution per year.

The advantages and objects of the invention will become evident from the following detailed description, when read in conjunction with the accompanying drawings which illustrate the preferred embodiments of the invention.

BRIEF DESCRIPTION OF THE DRAWINGS

FIG. 4 is a top sectional view of the world globe taken along lines 4—4 shown in FIG. 3.

FIG. 5 is a sectional side view of the tube and lever mechanism for driving the 24 hour time band taken along lines 5—5 shown in FIG. 4.

FIG. 6 is a top sectional view of the lever mechanism of the month dial taken along lines 6—6, shown in FIG. 3.

FIG. 7 is a side view of the lever mechanism connected to the 24 hour time band taken along lines 7—7 shown in FIG. 6.

FIG. 8 is a side view of the synchronous motor used in driving the month dial taken along lines 8—8 shown in FIG. 6.

FIG. 9 is a side sectional view of the lever mechanism used in connecting the month dial to the light shade taken along lines 9—9 shown in FIG. 6.

FIG. 10 is a front view of the month dial and day light savings time lever taken along lines 10—10 shown in FIG. 6.

DETAILED DESCRIPTION OF THE DRAWINGS

Figure 1:
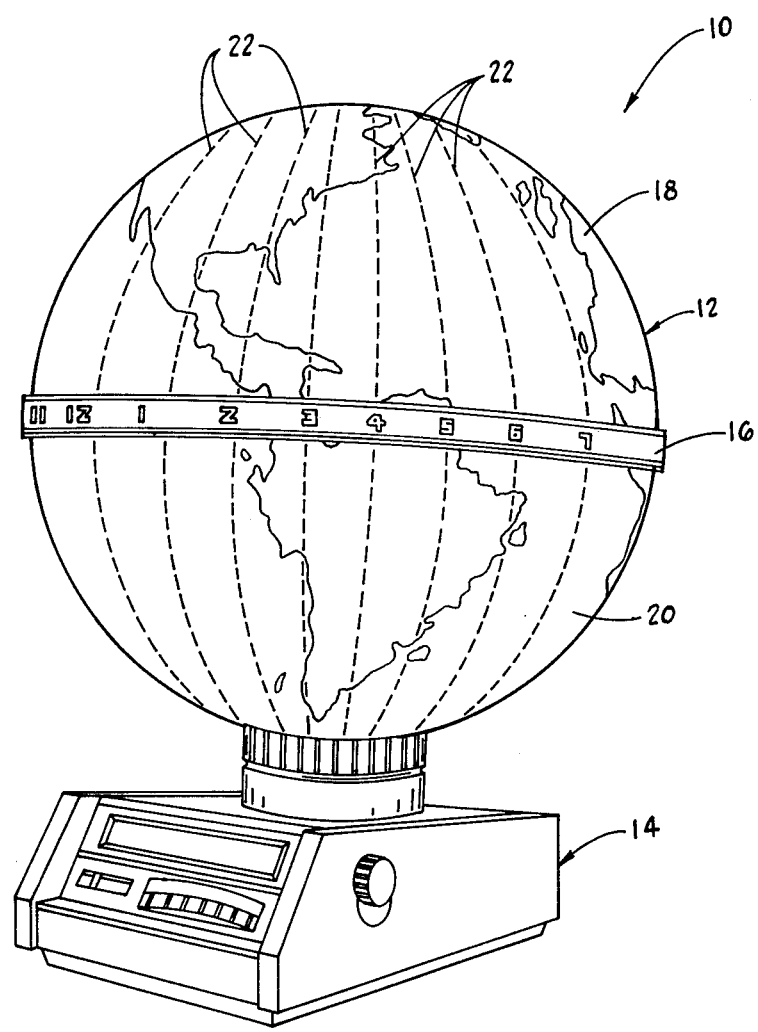
FIG. 1 is a perspective view of the three dimensional time piece.

In FIG. 1, the three dimensional time piece is designated by general reference numeral 10. The time piece 10 includes a hollow, translucent world globe 12 mounted on a base 14. A 24 hour time band 16 is disposed laterally around the globe 12 dividing the globe into a northern hemisphere 18 and a southern hemisphere 20. The globe 12 may be positioned vertically on the base 14 or tilted at an angle.

In this view, the hours of 11, 12, and 1 through 7 are shown. The time band 16 may be marked with the numbers 1 through 24 representing the 24 hours of the day, or 1 through 12 for the p.m. of the day and 1 through 12 for the a.m. of the day.

The globe 12 is divided longitudinally by 24 lines representing the time zones of the world. The lines are indicated by numeral 22 and are positioned 15° apart. The International date line may be indicated on the globe 12 and would be shown as one of the 24 time zones.

The globe 12 is swiveable on the top of the base 14 and can be rotated manually to bring any portion of the globe 12 to the front of the base 14 without interrupting the lighting or time synchronization of the time piece 10.

By turning the globe 12 on the base 14 and finding a particular location in the world, and following adjacent lines 22 downward toward the time band 16, the correct time at the location can be determined. For example, in FIG. 1, the state of Florida in the United States would appear to have a time between 2 o'clock and 3 o'clock. Assuming it was day light in the United States, then this time would be in the p.m. As will be discussed in the description of FIG. 2, the base 14 includes a clock having the hours, minutes, and seconds of the day. By looking at the clock in the base 14 and finding that it is 30 minutes past the hour, then in our example, the time in the state of Florida will be 2:30 in the afternoon.

Figure 3:
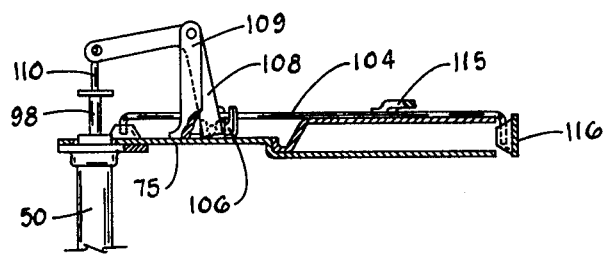
FIG. 3 is a sectional side view of the three dimensional time piece taken along line 3—3 shown in FIG. 2.
Figure 2:
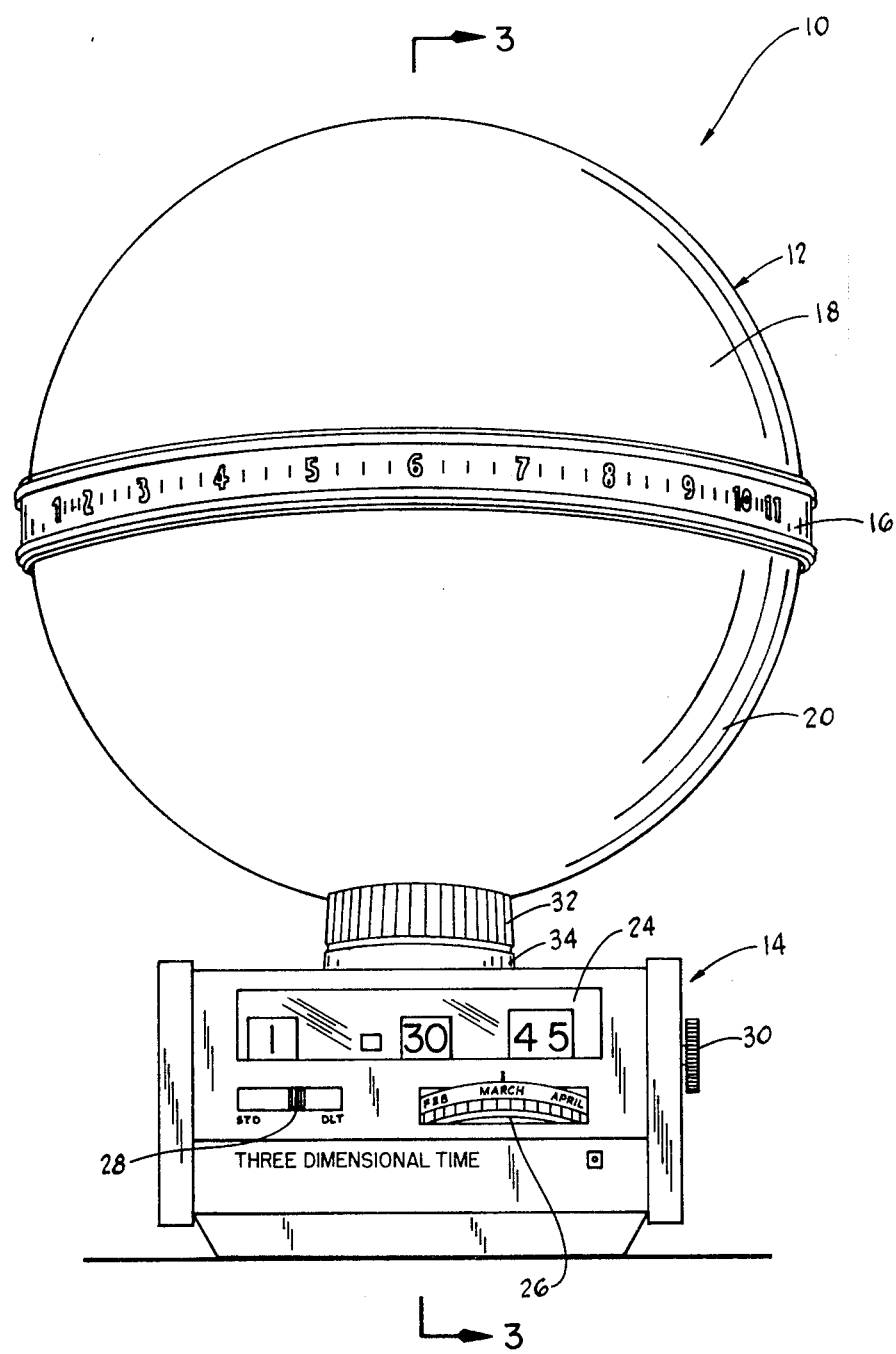
FIG. 2 is a front view of the three dimensional time piece.

In FIG. 2, a front view of the time piece 10 is illustrated. In this view, the base 14 can be seen having a clock face 24 indicating a time of 1 hour, 30 minutes, and 45 seconds. The clock face 24 is mounted in front of a clock 25 as shown in FIGS. 3 and 10. The clock 25 may be a digital clock or any other type of clock suitable for mounting inside the base 14.

Also mounted in the front of the base 14, is a month dial 26. In this drawing, the month dial 26 indicates that the present month is March. Adjacent the month dial is a lever 28 which corrects the time band 16 from standard time to day light savings time and visa versa. The time in the clock face 24 may be corrected by a time setting knob 30 disposed on the side of the base 14.

The base 14 and globe 12 are attached by a locking ring 32 and a mounting ring 34. By loosening the locking ring 32 on the mounting ring 34, the hours on the time band 16 can be correctly positioned on the globe 12.

In FIG. 3, a cross sectional side view of the time piece 10 taken along lines 3—3 is illustrated. In this view, the clock 25 is shown mounted behind the clock face 24. The clock 25 is attached to electrical wiring 37 for providing power thereto. While electrical wiring 37 is shown in the drawings, it should be appreciated that the time piece 10 can be powered equally well by batteries.

The world globe 12 is mounted on the top of a base 14 by a lock assembly 38. The lock assembly 38 includes the locking ring 32, the mounting ring 34, an inner ring 40, and a mounting plate 42. The locking ring 32 includes an inner eccentric surface 44 which when tightened, wedges between an upper flange portion 46 of the mounting ring 34 and the outer surface 48 of the inner ring 40. When the locking ring 32 is tightened, the globe 12 is held in place on top of the base 14. When the locking ring 32 is loosened, the globe 12 may be turned for correcting the time band 16 on the globe 12. The locking ring 32 is shown in a loose position.

A tubular shaft 50 extends through the inner ring 40 and to the center of the globe 12. The shaft 50 rotates the entire assembly inside the globe including the time band 16. The lower portion of the tubular shaft 50 is attached to a pinion gear 52. The pinion gear 52 is driven by a drive gear 54. The drive gear 54 is attached to a synchronous motor 56. The synchronous motor 56 is attached to a plate 58 which is secured by a screw to the mounting plate 42. The synchronous motor 56 is used to drive or turn the assembly inside the globe to which the time band 16 is attached, and makes one revolution every 24 hours. The motor 56 is powered by electrical collector rings 60 and brushes 62. The rings 60 and brushes 62 are connected to wiring 64 attached to an electrical terminal 66. The terminal 66 is connected to a power source by wire 67.

As mentioned above, the globe 12 swivels on the base 14. The globe swivels by attaching a lower portion 68 of the mounting ring 34 to an edge portion 70 of the top of the base 14. The edge portion 70 is around an annular opening in the top of the base 14. The edge portion 70 is held between the lower portion 68 of the ring 34 and a pair of clamps 72 attached to the bottom of the lower portion 68. This connection provides a swivel for turning the globe 12, lock assembly 38, shaft 50, and motor 56, 360° on top of the base 14. The electrical brushes 62 also swivel around the rings 60, thereby providing continuous power to the motor 56.

A revolving assembly 74 having an assembly plate 75 is mounted inside the globe 12 and attached to the top of the tubular shaft 50. The assembly 74 includes an opaque light shade 76 pivotly mounted on the assembly plate 75. The light shade 76 is slightly smaller than the inner diameter of the globe 12 and is suspended vertically inside the globe 12 for substantially dividing the inside of the globe 12 in half. Attached to the center of the light shade 76 and disposed on one side thereof, is a light 78. The light 78 is positioned adjacent the inside surface of the globe 12 so that a brighter area is shown on the surface of the globe 12, thereby indicating where on the globe 12 the sun is directly over head. The light 78 lights the left side of the globe 12 thereby depicting day time in this part of the world.

A second light 80 is attached to the assembly 74 and is disposed on the opposite side of the light shade 76 from the light 78. The second light 80 is hooded by a light shade 82 having an opening 84 adjacent the time band 16. The second light 80 provides light through the opening 84 for the time band 16 so that the time band 16 may be read on the dark side or night time of the world.

The lights 78 and 80 are connected to wires 85, which are fed through the shaft 50 and attached to the electrical collector 60.

The time piece 10 further includes the feature of tilting the light shade 76 and light 78 at an angle up to 66½° with the axis of the globe 12 in either the northern hemisphere 18, or the southern hemisphere 20. This tilting of the light shade 76 and light 78 coincides with the maximum angular deviation the sun makes with the earth as its extreme position in a yearly cycle.

In FIG. 3, the light 78 is positioned adjacent the time band 16. This position would indicate that the sun is directly overhead in countries along the equator of the world. As the summer months approach the northern hemisphere, the light shade 76 and light 78 would continue to move upward, until the sun, represented by light 78, would be positioned in its normal inclination for this time of the year.

The shade 76 is attached to a pivot arm 90, which in turn is connected to a second pivot arm 92 mounted on a vertical standard 94. The standard 94 is secured to the top of the assembly plate 75. A bell crank 96 is pivotly attached at one end to the second pivot arm 92. The other end of the bell crank 96 is attached to the top of a push pull tube 98 disposed inside the tubular shaft 50 and extending therethrough. The bottom end of the push pull tube 98 is attached to a second bell crank 100. The second bell crank 100 is supported on a rigid support arm 101 and is pivotly attached to a third pivot arm 102, which is moved up and down by the dial 26 rotated by a synchronous motor shown in FIGS. 8 and 10. The mechanical linkage just described, raises and lowers the push pull arm 98, which in turn raises and lowers the light shade 76 and light 78 over a 1 year period.

In FIG. 4, a top view of a cross section of the globe 12 is shown taken along lines 4—4 shown in FIG. 3. In this view, a time band rod 104 is shown attached to the time band 16. The rod 104 is pivotly attached to the assembly plate 75 and one end of a bell crank 106. As the assembly 74 rotates, the rod 104 rotates the time band 16 around the circumference of the globe 12. The bell crank 106 is attached to one end of a second bell crank 108, which is pivotly attached to a vertical standard 109. The other end of the second bell crank 108 is attached to a second push pull rod 110. The rod 110 is disposed inside the first push pull tube 98 and extends therethrough. The bottom portion of the second push pull rod 110 is attached to one end of a third bell crank 112 shown in FIG. 7. The other end of the crank 112 is connected to a pivot arm 114, which in turn is attached to the lever 28. By moving the lever 28, the rod 110 is either raised or lowered, thereby rotating the bell crank 106, which in turn moves rod 104 on a rod guide 115. The rod 104 moves the time band 16, 15° or 1 hour, and the time band 16 is adjusted by 1 hour for observing day light savings time.

In FIG. 5, a side view of the top portion of the second push pull rod 110 is more clearly illustrated connected to the bell cranks 106, and 108. In this view, the time band rod 104 can be seen attached to a portion of the time band 16.

FIG. 6 illustrates a top view of the month dial 26 and lever 28. The dial 26 is rotated one revolution per year by a chain driven synchronous motor 119 shown in FIGS. 8 and 10. The dial 26 includes an eccentric groove 120 offset in the center of the top of the dial 26. A cam follower arm 122 is attached to one end of the third pivot arm 102. The arm 122 is attached to the dial 26 by a guide 124 through the center of the dial 26 and a guide 126 offset from the center of the dial 26. The guides 124 and 126 ride in elongated slots 128 and 130 in the arm 122. A cam 132 shown in FIG. 9 extends downwardly from the arm 122 and rides in the groove 120. As the dial 26 rotates, the cam 132 riding in the groove 120 moves the attached arm 122 and the linkage attached thereto, which in turn moves the push pull tube 98 up and down so that the light 78 and shade 76 are moved to correspond with the change in seasons.

As discussed above, FIG. 7 illustrates the linkage for moving the second push pull tube 110 up and down.

In FIG. 8, a side view of the synchronous motor 119 is illustrated. The motor 119, which is driven by an electrical power source, drives a drive gear 132. The drive gear 132 is attached to a spring mounted pinion gear 134 by a chain 136. The pinion gear 134 and chain 136 are shown in FIG. 10.

In FIG. 9, a cross section of the dial 26 is illustrated. The dial 26 is rotated by the pinion gear 134. The pinion gear 134 is biased against a bottom portion 140 of the dial 26 by a spring 138.

In FIG. 10, the bottom portion 140 of the dial 26 is disposed against the top of the pinion gear 134. The bottom portion 140 includes ratchet teeth 142 for engaging the top of the pinion gear 134. The ratchet teeth 142 allow the dial to be turned in one direction on the pinion gear 134 for correcting the month of the year on the base 14. Also seen in FIG. 10, is the clock 25 disposed above the dial 26 and the synchronous motor 119 with the chain 136 attached thereto for turning the dial 26.

Changes may be made in the construction and arrangement of the parts or elements of the embodiment as disclosed herein without departing from the spirit or scope of the invention as defined in the following claims.

I claim:

1. A three dimensional time piece for determing the correct time anywhere in the world and whether the selected location in the world at that moment is in daylight or darkness, the time piece comprising:

a base;
   a world globe swivelly mounted on said base, said globe having 24 longitudinal lines equally spaced 15° apart on the surface of said globe and representing the time zones of the world, said globe made of translucent material for shining light therethrough;
   a time band attached to the globe and mounted on the equator of said globe, said band indicating the 24 hours of the day;
   a light attached to one side of a light shade, said light and said light shade disposed inside said globe, said shade longitudinally dividing the inside of said globe, the unlighted side of said globe representing nighttime in the world while the lighted side of said globe represents daytime;
   an electrically driven synchronous motor attached to a drive gear for driving a pinion gear, said pinion gear turning a tubular shaft disposed inside said globe and attached to said time band and said light shade for turning said time band and said light shade one revolution per 24 hours;
   a time clock mounted inside said base for telling the present time at the location of the time piece; and
   a dial indicating the month of a year, said dial attached to said base and said light shade, said dial driven by a second electrically driven synchronized motor one revolution per year, said dial by turning adjusts the tilt of said light shade and said light in said globe thereby changing the light intensity reflected on the northern and southern hemispheres of said globe and representing the inclination of the sun and the corresponding season of the year.

2. The time piece as described in claim 1, further including a lever attached to said base and said time band, by moving said lever said time band is moved 15° thereby changing the time indicated on a particular location in the world by one hour, said lever used for changing said time piece, when day light savings time is observed.

3. The time piece as described in claim 1, further including a hooded secondary light attached to and disposed on the night time side of said light shade, said hooded secondary light positioned adjacent to said time band and providing a source of light for reading said time band on the unlighted side of said globe.

4. A three dimensional time piece for determining the correct time anywhere in the world and whether the selected location in the world at that moment is in daylight or darkness, the time piece comprising:

a base;
   a world globe swivelly mounted on said base, said globe having 24 longitudinal lines equally spaced 15° apart on the surface of said globe and representing the time zones of the world, said globe made of translucent material for shining light therethrough;
   a time band attached to the globe and mounted on the equator of said globe, said band indicating the 24 hours of the day;
   a light attached to one side of a light shade, said light and said light shade disposed inside said globe, said shade longitudinally dividing the inside of said globe, the unlighted side of said globe representing nighttime in the world while the lighted side of said globe represents daytime;
   an electrically driven synchronous motor attached to a drive gear for driving a pinion gear, said pinion gear turning a tubular shaft disposed inside said globe and attached to said time band and said light shade for turning said time band and said light shade one revolution per 24 hours;
   a time clock mounted inside said base for telling the present time at the location of the time piece;
   a dial indicating the month of a year, said dial attached to said base and said light shade, said dial driven by a second electrically driven synchronized motor one revolution per year, said dial by turning adjusts the tilt of said light shade and light in said globe thereby changing the light intensity reflected on the northern and southern hemispheres of said globe and representing the inclination of the sun and the corresponding season of the year;
   a hooded secondary light attached to and disposed on the nighttime side of said light shade, said hooded secondary light positioned adjacent to said time band for providing a source of light for reading said time band on the unlighted side of said globe; and a lever attached to said base and to said time band, by moving said lever, said time band is moved 15° thereby changing the time indicated on a particular location in the world by one hour, said lever used for changing the time piece when daylight savings time is observed.

* * * * *